United States Patent
Laugier et al.

(10) Patent No.: US 10,290,116 B2
(45) Date of Patent: May 14, 2019

(54) DYNAMIC SCENE ANALYSIS METHOD, AND ASSOCIATED ANALYSIS MODULE AND COMPUTER PROGRAMME

(71) Applicants: INRIA INSTITUT NATIONAL DE RECHERCHE EN INFORMATIQUE ET EN AUTOMATIQUE, Le Chesnay (FR); CENTRE NATIONAL DE LA RECHERCHE SCIENTIFIQUE (CNRS), Paris (FR); COMMISSARIAT A L'ENERGIE ATOMIQUE ET AUX ENERGIES ALTERNATIVES, Paris (FR)

(72) Inventors: Christian Laugier, Montbonnot Saint Martin (FR); Amaury Negre, Villard-Bonnot (FR); Mathias Perrollaz, Grenoble (FR); Lukas Rummelhard, Grenoble (FR)

(73) Assignees: Inria Institut National De Recherche En Informatique Et En Automatique, Le Chesnay (FR); Centre National De La Recherche Scientifique, Paris (FR); Commissariat A L'Energie Atomique Et Aux Energies Alternatives, Paris (FR)

( * ) Notice: Subject to any disclaimer, the term of this patent is extended or adjusted under 35 U.S.C. 154(b) by 233 days.

(21) Appl. No.: 15/316,779

(22) PCT Filed: Jun. 2, 2015

(86) PCT No.: PCT/FR2015/051449
§ 371 (c)(1),
(2) Date: May 11, 2017

(87) PCT Pub. No.: WO2015/185846
PCT Pub. Date: Dec. 10, 2015

(65) Prior Publication Data
US 2017/0256071 A1    Sep. 7, 2017

(30) Foreign Application Priority Data

Jun. 6, 2014 (FR) ...................................... 14 55183

(51) Int. Cl.
*G06K 9/00* (2006.01)
*B60T 7/22* (2006.01)
(Continued)

(52) U.S. Cl.
CPC .................. *G06T 7/70* (2017.01); *B60T 7/22* (2013.01); *B60W 40/04* (2013.01); *G01S 17/87* (2013.01);
(Continued)

(58) Field of Classification Search
CPC .............................. G06T 9/77; G06K 9/00791
See application file for complete search history.

(56) References Cited

U.S. PATENT DOCUMENTS

| | | | | |
|---|---|---|---|---|
| 6,393,370 B1 * | 5/2002 | Soika | ................ | G01S 7/52004 702/104 |
| 2008/0252433 A1 * | 10/2008 | Yguel | .................. | G08G 1/161 340/435 |

(Continued)

FOREIGN PATENT DOCUMENTS

| | | |
|---|---|---|
| EP | 2289754 A1 | 8/2009 |
| FR | 2890773 A1 | 9/2009 |

(Continued)

OTHER PUBLICATIONS

Gindele, Tobias, et al., Bayesian Occupancy Grid Filter for Dynamic Environments Using Prior Map Knowledge, 2009, Karlsruhe, Germany.

(Continued)

*Primary Examiner* — Ping Y Hsieh
*Assistant Examiner* — Jose Torres
(74) *Attorney, Agent, or Firm* — Moritt Hock & Hamroff LLP; Bret P. Shapiro

(57) ABSTRACT

A method for analyzing a dynamic scene partitioned into cells which involves determining a probability of occupancy of a cell and a probability or probabilities of movement of the cell by solving the equation $P(OV|ZC) = \Sigma A0^{-1\,V-1}P(CA00^{-1}VV^{-1}Z)/\Sigma A00^{-1}VV^{-1}P(CA00^{-}VV^{-1}Z)$ comprising the determination of the speeds and positions of dummy particles in the grid depending on those determined at the $(k-1)^{th}$ iteration and the probability $P(V|V-1)$; the determination of the particles located in each cell depending on the (Continued)

determined positions, and the solving of the equation, for a cell, is split into the solving of a static part corresponding to P(0=empty, V=0|ZC) and P(0=occupied, V=0|ZC) and the solving of a dynamic part corresponding to P(0=occ, V=$v^k_i$, |ZC), i=32 1 to $n^k$, in which $n^k$ is the number of particles determined in cell C for the $k^{th}$ iteration.

9 Claims, 2 Drawing Sheets

(51) Int. Cl.
| | |
|---|---|
| G06N 7/00 | (2006.01) |
| G06T 7/20 | (2017.01) |
| G06T 7/70 | (2017.01) |
| G08G 1/04 | (2006.01) |
| B60W 40/04 | (2006.01) |
| G01S 17/87 | (2006.01) |
| G06F 17/18 | (2006.01) |
| G01S 17/93 | (2006.01) |
| G08G 1/16 | (2006.01) |
| G06T 7/277 | (2017.01) |
| B60W 40/12 | (2012.01) |

(52) U.S. Cl.
CPC ............ *G01S 17/936* (2013.01); *G06F 17/18* (2013.01); *G06K 9/00805* (2013.01); *G06N 7/005* (2013.01); *G06T 7/20* (2013.01); *G06T 7/277* (2017.01); *G08G 1/166* (2013.01); *B60T 2201/022* (2013.01); *B60W 40/12* (2013.01); *B60W 2420/42* (2013.01); *G06T 2207/10016* (2013.01); *G06T 2207/20076* (2013.01); *G08G 1/04* (2013.01)

(56) References Cited

U.S. PATENT DOCUMENTS

| | | | | |
|---|---|---|---|---|
| 2010/0305858 | A1* | 12/2010 | Richardson | G06K 9/00785 701/301 |
| 2012/0053755 | A1* | 3/2012 | Takagi | B60W 40/04 701/1 |
| 2015/0154328 | A1* | 6/2015 | Michalke | G06F 17/5009 703/1 |
| 2015/0310146 | A1* | 10/2015 | Tanzmeister | G08G 1/167 703/2 |

FOREIGN PATENT DOCUMENTS

| | | |
|---|---|---|
| WO | 028932 A1 | 3/2007 |
| WO | 185846 A1 | 12/2015 |

OTHER PUBLICATIONS

Baig, Qadeer, et al., Using Fast Classification of Static and Dynamic Environment for Improving Bayesian Occupancy Filter (BOF) and Tracking, 2012, China.

Negre, Amaury, et al., Hybrid Sampling Bayesian Occupancy Filter, 2014, Dearbourn, Michigan.

Coue, Christophe, et al., Bayesian Occupancy Filtering for Multitasking Tracking: an Automotive Application. The International Journal of Robotics Research, SAGE Publications (UK and US) 2006, 25, 25 (1), pp. 19-30.

Elfes, Alberto, Using Occupancy Grids for Mobile Robot Perception and Navigation, 1989, Pittsburgh, PA.

Laugier, Christian, et al., Probablistic Analysis of Dynamic Scenes and Collision Risks Assessment to Improve Driving Safety, IEEE Intelligent Transportation Systems Magazine, Winter 2011.

* cited by examiner

DYNAMIC SCENE ANALYSIS METHOD, AND ASSOCIATED ANALYSIS MODULE AND COMPUTER PROGRAMME

CROSS REFERENCE TO RELATED APPLICATION

This application is a U.S. National Stage filing under 35 U.S.C. § 371 of International Application Ser. No. PCT/FR2015/051449 filed on Jun. 2, 2015. International Application Ser. No. PCT/FR2015/051449 claims priority to French Application No. 1455183 filed on Jun. 6, 2014. The disclosure of these applications is hereby incorporated by reference in their entirety.

The present invention relates to a method for analyzing a dynamic scene observed with the aid of a block of sensor(s) comprising a step of defining a grid partitioned into cells and corresponding to the observed scene; and the iterative implementation by computer of the steps:
- collecting at least one new observation of the block of sensor(s) at the $k^{th}$ iteration and determining, as a function of the new collected observation, a first probability of occupancy of each cell of the grid modeling the operation of the block of sensor(s);
- determining, for each cell, at the $k^{th}$ iteration, a second probability of occupancy of the cell and a set of probability (probabilities) of motion of the content of the cell as a function of the first probability of occupancy of the cell determined at the $k^{th}$ iteration.

According to the BOF ("Bayesian Occupancy Filter") Bayesian perception algorithms, the observed scene is represented by an occupancy grid subdivided into cells and is analyzed in terms of occupied cells and of their evolution over time. For each cell of this occupancy grid and at each iteration of the algorithm, a probability of occupancy of the cell is calculated, as well as a distribution of probabilities of motion of the content of the cell. This distribution is represented in the form of a motion distribution grid, also called a neighborhood transition histogram.

In FIG. 1, a view of an occupancy grid of the environment $G_{OCC}$ is represented, of 16 cells by 16 cells. In this representation, the closer together the hatching covering a cell, the larger the value of the cell occupancy probability. A transition histogram Hist(C) determined for a cell, referenced C, of the grid $O_{cc}$ is also represented in FIG. 1. Each box of the histogram determined for the cell C represents, for the time-step considered, the transition from the cell C to said box; with each box of the histogram is thus associated a velocity vector of distinct value; in the present case, the cell at the center of the histogram corresponds to the transition from the cell C to itself.

These algorithms have the advantage of providing a reliable and synthetic analysis of a dynamic scene, but exhibit a certain number of limitations.

In the case of a grid in motion, for example corresponding to the environment analyzed from a vehicle in motion, spatio-temporal aliasing problems occur. Furthermore, it is necessary to use occupancy grids and motion histograms at high resolution to detect slow motions and small objects, and also to evaluate the velocity of very dynamic objects (for example other vehicles in motion). Typically, if the norm of the maximum velocity of the vehicle is $V_{max}$, the size of the motion distribution grid maintained in the course of the algorithm must make it possible to represent velocities from $-2V_{max}$ to $+2V_{max}$: each iteration of the algorithm therefore involves estimating the distribution probability of the velocities in each box of this grid for each cell. The volume of calculation required is therefore very significant. This problem is crucial, especially in cases of an analysis onboard a vehicle.

For this purpose, according to a first aspect, the invention proposes a method for analyzing a dynamic scene observed with the aid of a block of sensor(s) of the aforementioned type, characterized in that the second probability of occupancy of the cell and of the set of probability (probabilities) of motion of the content of the cell as a function of the first probability of occupancy of the cell determined at the $k^{th}$ iteration is determined by solving the equation $$P(OV \mid ZC) = \frac{\Sigma_{AO^{-1}V^{-1}} P(CAOO^{-1}VV^{-1}Z)}{\Sigma_{AOO^{-1}VV^{-1}} P(CAOO^{-1}VV^{-1}Z)}$$

where C: identifier of the cell considered;
A: identifier of the cell which contained, at the $(k-1)^{th}$ iteration, what is contained in the cell considered at the $k^{th}$ iteration;
O: occupancy state of the cell considered, from among the "empty" and "occupied" states;
$O^{-1}$: occupancy state of the cell A at the $(k-1)^{th}$ iteration;
V: velocity of the cell C considered;
$V^{-1}$: velocity of the cell A at the $(k-1)^{th}$ iteration;
Z: observations of the sensors from the first iteration up to the $k^{th}$ iteration;
- the respective velocity and the respective position of a set of dummy particles in the grid are determined at the $k^{th}$ iteration as a function of the velocities, positions of the particles determined at the $(k-1)^{th}$ iteration and of the probability $P(V|V-1)$;
- the method comprises a step of determining the particles located in each cell as a function of the positions determined and in that the solving of the equation, for a cell, is split into the solving of a static part corresponding to $P(O=empty, V=0|ZC)$ and $P(O=occupied, V=0|ZC)$ and into the solving of a dynamic part corresponding to the $P(O=occ, V=v_i^k|ZC)$, $i=1$ to $n^k$, where $n^k$ is the number of particles determined in the cell C for the $k^{th}$ iteration;
- the static part of the cell C at the $k^{th}$ iteration being determined as a function of the static part of the cell C determined at the $(k-1)^{th}$ iteration and of $P(O|O^{-1})$;
- the probability of $P(O=occupied, V=v_i^k|ZC)$ of the dynamic part of the cell C being determined at the $k^{th}$ iteration as a function of the probability $P(O=occupied, V=v_i^{k-1}|ZA)$ calculated at the $(k-1)^{th}$ iteration for the dynamic part of the cell A and of $P(O|O^{-1})$, where the particle $p_i$ determined in the cell C at the $k^{th}$ iteration with a velocity $v_i^k$ was situated in the cell A at the $(k-1)^{th}$ iteration with a velocity $v_i^{k-1}$.

The method according to the invention makes it possible to markedly decrease the calculation and memory resources required for the determination of the occupancy of the cells and of the motion probability distributions during the iterations.

In embodiments, the analysis method according to the invention furthermore comprises one or more of the following characteristics:
- on completion of the $k^{th}$ iteration, one or more pairs $(p_i, (v_i^k, x_i^k))$, where $x_i^k$ is the position of the particle $p_i$ at the $k^{th}$ iteration, are duplicated within a cell (C) or deleted so that the number of pairs per cell is dependent on the dynamic part determined for the cell;

the method comprises a step of selecting the pair to be duplicated/deleted, the selection of said pair being carried out as a function of the probability P(O=occupied, $V=v_i^k|ZC$) determined at the $k^{th}$ iteration, where $v_i^k$ is the velocity component of the pair;

the total number of particles in the grid is constant during the iterations; P(O=empty, V=0|ZC) determined at the $k^{th}$ iteration and denoted $P^k$(O=empty, V=0|ZC), is determined as a function of the product of a first term dependent on the first probability of occupancy and of a second term, said second term being dependent on:

$$P^{k-1}(O=occ, V=0|ZC).(1-\varepsilon) + P^{k-1}(O=empty, V=0|ZC).\varepsilon, \text{ and/or}$$

coeff $(v_i^k)$. $P^{k-1}$(O=occupied, $V=v_i^{k-1}|ZA$).$(1-\varepsilon)$, where coeff $(v_i^k)$ is a decreasing function of $\|v_i^k\|$, and/or a probability of appearance $p_a$ of a new object in the observed scene.

According to a second aspect, the present invention proposes a computer program to be installed in an analysis module for analyzing a dynamic scene observed with the aid of a block of sensor(s) comprising a step of defining a grid partitioned into cells and corresponding to the observed scene, said program comprising instructions for implementing the steps of a method according to the first aspect of the invention during an execution of the program by processing means of the analysis module.

According to a third aspect, the present invention proposes an analysis module for analyzing a dynamic scene observed with the aid of a block of sensor(s) comprising a step of defining a grid partitioned into cells and corresponding to the observed scene; said device being adapted to, on the basis of a grid partitioned into cells and corresponding to the observed scene, iteratively implement the processing of:

collecting at least one new observation of the block of sensor(s) at a $k^{th}$ iteration and determining, as a function of the new collected observation, a first probability of occupancy of each cell of the grid and that models the operation of the block of sensor(s);

determining, for each cell, at the $k^{th}$ iteration, a second probability of occupancy of the cell and a set of probability (probabilities) of motion of the content of the cell as a function of the first probability of occupancy of the cell determined at the $k^{th}$ iteration, said analysis module being characterized in that it is adapted to determine said second probability of occupancy of the cell and the set of probability (probabilities) of motion of the content of the cell as a function of the first probability of occupancy of the cell determined at the $k^{th}$ iteration by solving the equation $$P(OV|ZC) = \frac{\Sigma_{AO^{-1}V^{-1}} P(CAOO^{-1}VV^{-1}Z)}{\Sigma_{AOO^{-1}VV^{-1}} P(CAOO^{-1}VV^{-1}Z)}$$

where C: identifier of the cell considered;
A: identifier of the cell which contained, at the $(k-1)^{th}$ iteration, what is contained in the cell considered at the $k^{th}$ iteration;
O: occupancy state of the cell considered, from among the "empty" and "occupied" states;
$O^{-1}$: occupancy state of the cell A at the $(k-1)^{th}$ iteration;
V: velocity of the cell C considered;
$V^{-1}$: velocity of the cell A at the $(k-1)^{th}$ iteration;
Z: observations of the sensors from the first iteration up to the $k^{th}$ iteration;

said module being adapted to determine, at the $k^{th}$ iteration, the respective velocity and the respective position of a set of dummy particles in the grid as a function of the velocities, of the positions of the particles determined at the $(k-1)^{th}$ iteration and of the probability P(V|V−1);

said module being adapted to determine particles located in each cell as a function of the positions determined and to split the solving of the equation, for a cell, into the solving of a static part corresponding to P(O=empty, V=0|ZC) and P(O=occupied, V=0|ZC) and into the solving of a dynamic part corresponding to the P(O=occ, $V=v_i^k|ZC$), i=1 to $n^k$, where $n^k$ is the number of particles determined in the cell C for the $k^{th}$ iteration;

said module being adapted to determine the static part of the cell C at the $k^{th}$ iteration as a function of the static part of the cell C determined at the $(k-1)^{th}$ iteration and of $P(O|O^{-1})$; and to determine the probability of P(O=occupied, $V=v_i^k|ZC$) of the dynamic part of the cell C at the $k^{th}$ iteration as a function of the probability P(O=occupied, $V=v_i^{k-1}|ZA$) calculated at the $(k-1)^{th}$ iteration for the dynamic part of the cell A and of $P(O|O^{-1})$, where the particle $p_i$ determined in the cell C at the $k^{th}$ iteration with a velocity $v_i^k$ was situated in the cell A at the $(k-1)^{th}$ iteration with a velocity $v_i^{k-1}$.

These characteristics and advantages of the invention will become apparent on reading the description which follows, given solely by way of example and with reference to the appended drawings in which.

Figure 1:
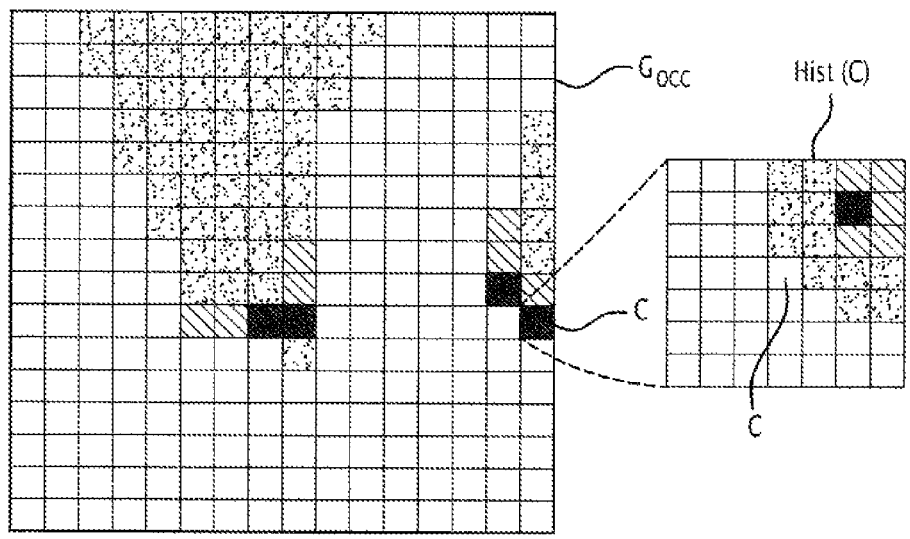
FIG. 1 represents an occupancy grid and the transition histogram of a cell of the grid.

In accordance with a usual convention in the field of probabilities, if U,V,W, arbitrary variables, P(U) designates the probability of obtaining U, and P(U|V) designates the probability of obtaining U, the value of V being known.

Moreover, the expression for the joint probability, which allows the estimation of the probability functions of combinations of variables, is the following:

$$P(W|U) = \frac{\Sigma_V P(UVW)}{\Sigma_{V,W} P(UVW)}$$

A BOF algorithm estimates, in the course of successive iterations, and with the aid of a spatial grid decomposed into cells and representing the analyzed scene, the occupancy of the cells of the grid and the motion of the content of the cells, with the aid of probabilities dependent on random variables representing the quantities to be studied, which are associated with each cell and whose evolutions during the iterations describe the playing out of the observed scene (cf. notably Pierre Bessière, Emmanuel Mazer, Juan Manuel Ahuactzin-Larios, and Kamel Mekhnacha, "Bayesian Programming", CRC Press, December 2013, or MK Tay, Kamel Mekhnacha, Cheng Chen, and Manuel Yguel, "An efficient formulation of the Bayesian occupation filter for target tracking in dynamic environments", International Journal of Vehicle Autonomous Systems), 6(1):155-171, 2008).

The variables considered in the present case are described hereinafter:

C: identifier of the cell considered;

A: identifier of the "antecedent": the antecedent is the cell which contained, at the previous iteration, what is contained in the cell considered at the current iteration;

O: occupancy of the cell considered; the occupancy takes a state from among "empty" and "occupied";

$O^{-1}$: occupancy of the antecedent at the previous iteration;

V: velocity (vector of dimension 2) of the cell considered;

$V^{-1}$: velocity of the antecedent at the previous iteration

Z: observations of the sensors from the first iteration up to the current iteration.

The joint probability is expressed with the aid of equation (1) hereinbelow:

$$P(CAOO^{-1}VV^{-1}Z) = P(A)P(O^{-1}V^{-1}|A)P(OV|O^{-1}V^{-1})P(C|AV)P(Z|OVC),$$

where:

the probabilities P(A) represent the distribution over all the possible antecedents A; it is, in the embodiment considered, chosen to be uniform, a cell being considered to be reachable from all the other cells of the grid with an equal probability;

$P(O^{-1}V^{-1}|A)$ is the conditional joint distribution on the occupancy and the motion of the antecedents; the probabilities corresponding to this distribution are calculated at the iteration preceding the iteration considered;

$P(OV|O^{-1}V^{-1})$ is the dynamic prediction model; the chosen model can be decomposed as the product of two terms: $P(O|O^{-1})P(V|V^{-1}O)$, where:

$P(O|O^{-1})$ is the conditional distribution on the occupancy of the cell considered, the occupancy of the antecedent being known; this distribution is defined by the transition matrix T, $$T = \begin{bmatrix} 1-\varepsilon & \varepsilon \\ \varepsilon & 1-\varepsilon \end{bmatrix},$$

which permits a change of occupancy state of a cell with a low probability so as to take account of evaluation errors and observation errors;

$P(V|V^{-1}O^{-1})$ is the conditional distribution on the velocity of the current iteration, the velocity at the previous iteration being known; usually it follows a normal law, centered on the velocity at the previous iteration so as to represent a Gaussian acceleration model; this distribution can be adapted to correspond to various observed objects; and since it is considered that an empty cell cannot move, a Dirac function is added to prohibit motion in this case;

P(C|AV) is the distribution which indicates whether the cell C considered is accessible from the known antecedent A=a and with the known velocity V=v; this distribution is a Dirac function with a value equal to 1 if and only if a+v.dt∈C, where dt is the time-step separating the current iteration from the previous iteration;

P(Z|OVC) is the distribution on the observation values of the sensor, also called the "sensor model".

A BOF algorithm estimates, in the course of successive iterations, the occupancy of the cells and the velocity of the content of the cells as a function of current observations provided by the sensor(s) for each cell, by determining P(OV|ZC).

By discretizing the antecedent cells and the velocities, P(OV|ZC) can be written with the aid of the following equation (2):

$$P(OV|ZC) = \frac{\Sigma_{AO^{-1}V^{-1}} P(CAOO^{-1}VV^{-1}Z)}{\Sigma_{AOO^{-1}VV^{-1}} P(CAOO^{-1}VV^{-1}Z)}$$

Figure 2:
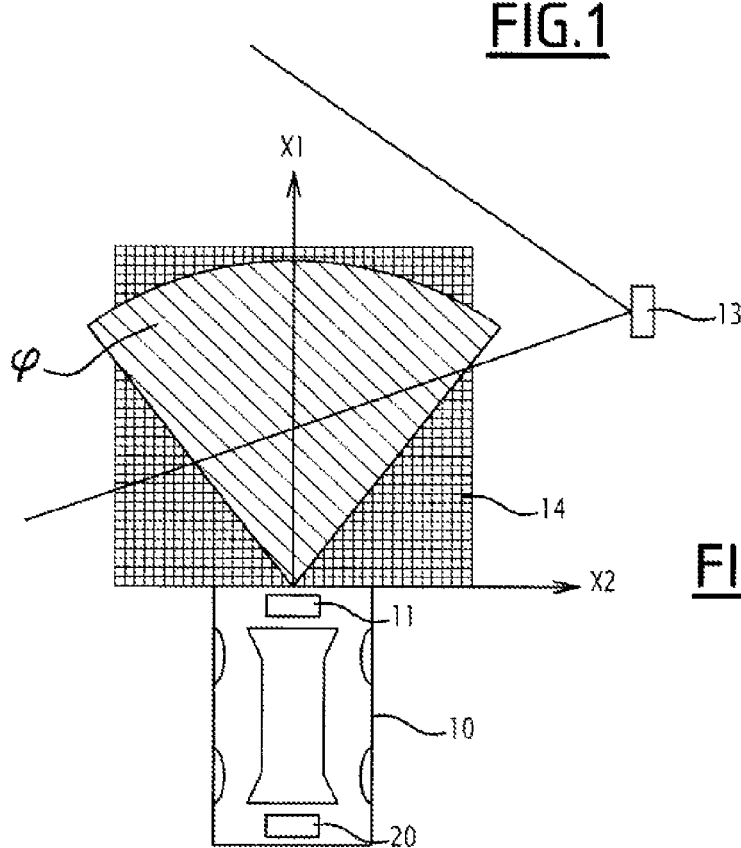
FIG. 2 represents a view of a vehicle and of a grid covering a scene around the vehicle in an embodiment of the invention.

In FIG. 2, a vehicle 10 is represented viewed from above. The vehicle 10, in addition to the usual means of locomotion specific to vehicles, comprises a sensor block 11 and an analysis device 20 in a mode of implementation of the invention.

Figure 3:
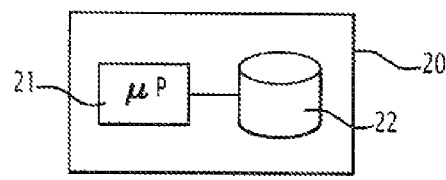
FIG. 3 represents an analysis device in an embodiment of the invention.

As represented schematically in FIG. 3, the analysis device 20, also called an HSBOF (for "Hybrid Sampling BOF") module comprises a microprocessor 21 and a memory 22. The memory 22 comprises software instructions, which when they are executed by the microprocessor 21, implement the steps indicated hereinbelow and carried out by the analysis device 20. In the case considered, the analysis device 20 furthermore comprises a parallel calculation accelerator adapted to process, in parallel, operations implemented in the method detailed hereinbelow.

The sensor block 11 is adapted on the one hand to estimate the displacements of the vehicle 10, in the form of translations and rotations. These displacement estimations are provided to the analysis device 20.

The sensor block 11 furthermore comprises an onboard sensor (or several onboard sensors) making it possible to perform measurements and, as a function of these measurements, to detect the presence of occupied zones for example likened according to certain criteria to obstacles in the environment of the vehicle 10 and their positions with respect to a reference frame (X1, X2) tied to the vehicle (it will be noted that in other embodiments, an instantaneous depth map is determined as a function of these measurements).

Such a sensor comprises for example a laser telemeter furnished with a source emitting a laser beam and which performs a scan of a surface φ in the plane (X1, X2), and/or a stereo camera, etc. and detects the presence of obstacle(s) in the scanned scene, and their position as a function of the analysis of reflected beams received by the telemeter.

These observation data of the scene comprising the position of detected obstacles are provided by the sensor 11 to the analysis device 20.

In embodiments, observation data of the scene indicating the presence of obstacle(s) in the scanned scene, and their position, are provided to the analysis device 20 by one or more exterior sensors 13 outside the vehicle 10, for example a sensor fixed on the edge of the road on which the vehicle 10 is traveling.

A spatial grid 14 is moreover considered, corresponding to a portion of the environment of the vehicle 10, for example a view from above of a zone of fixed width and fixed length in the plane (X1, X2), for example of 20 meters each, which extends for example forward from the vehicle in the direction of the longitudinal axis X1 of the vehicle. This grid 14 is partitioned into cells C, for example 100 000 cells, so as to constitute a spatial grid representing a view from above of the environment of the vehicle.

The analysis device 20 is adapted to deduce, at each instant $t_k=t_0+k.dt$, from these vehicle environment observation data received from the sensor or sensors 11, the distribution on the observation values received, also called a "sensor probabilistic model": P(Z|OVC).

Thus let $z^k$ be the observations of the environment of the sensor block 11 to be considered for the instant $t^k$. The probability P(Z|OVC) determined at the instant $t_k$ for each cell C of the grid 14 by the analysis module 20 as a function of the observations $z^1$ to $z^k$ received at the iteration instants $t_1$ to $t_k$ models the behavior of the sensor 11 and takes into account the noise introduced into the measurement by the sensor block 11, the inaccuracy factors such as the temperature, the lighting, the colors of the objects, the masking of objects, the capacity of the sensor to detect or otherwise the objects and to detect objects when there are none ("false detections"). It will be noted that in the case considered the observation Z does not take the form of the coordinates of the objects detected in the reference frame tied to the vehicle and with axes X1, X2, but takes the value 1 in a cell C where an obstacle has been detected and 0 otherwise. The sensor probabilistic model is, depending on the case, estimated on the basis of a modeling of the physical characteristics of the sensor and of the objects to be detected, or "learnt" experimentally.

Examples of models of sensors are for example described in FR 0552736 or else at the address http://ieeexplore.ieee.org/stamp/stamp.jsp?tp=&arnumber=30720&tag=1.

In the present case, by considering that the analysis module 20 collects at an instant $t_k$ updated observation data provided by m sensors, each providing observations $z^j$, j=1 to m, the observation vector $z_k=(z^1, z^2, \ldots, z^m)$. Typically, a laser gives an observation corresponding to a list of impact distance values for various directions. The analysis module 20 obtains at each instant $t_k$ an updated vector of observations $z_k$. On the basis of these instantaneous vectors, the analysis device 20 deduces from $z_k$ and from the "sensor model" (here in this instance multi-sensor) the probability P(Z=$z_k$|OVC), thereby giving an instantaneous grid (indicating for each C, if the box was occupied, and with such velocity, what would be the probability of having these observations) which is thereafter provided as input data to step 103 detailed below and in which the probabilities P(OV|$z^1$ ... $z^k$C) are calculated recursively using the evaluations P (OV|$z^1$ ... $z^k$C) calculated at $t_{k-1}$.

The invention rests upon the following principles:
- decomposition of each cell into a static part corresponding to the unoccupied part of the cell and to the part of the cell occupied by objects with zero velocity, and into a dynamic part corresponding to the part of the cell occupied by objects in motion;
- representing the motion distribution of a cell of the occupancy grid by a set of particles representing the dynamic part of the cell, in place of a regular grid of motion distribution, thereby allowing a more compact representation.

Thus the determination of P(OV|ZC) amounts to calculating the probability associated with each particle P(O=occ, V=$v_k$|ZC) and the probabilities associated with the static domain P(O=occ, V=0|ZC) and P(O=empty, V=0|ZC).

By using the decomposition (1) and by considering the denominator of equation (2) to be a scale factor, this equation (2) can be rewritten in the following manner:

$$P(OV|ZC) \propto P(Z|OC) \left[ \sum_{AO^{-1}V^{-1}} P(A)P(O^{-1}V^{-1}|A)P(O|O^{-1})P(V|OV^{-1})P(C|AV) \right] \quad (3)$$

where the symbol "∝" signifies "is proportional to". We write $$\alpha(o, v) = \left[ \sum_{AO^{-1}V^{-1}} P(A)P(O^{-1}V^{-1}|A)P(o|O^{-1})P(v|oV^{-1})P(C|Av) \right] \quad (4)$$

where the value of o is the occupancy state "occupied" (called "occ") or "empty", and v is a velocity.

Method 100

Figure 4:
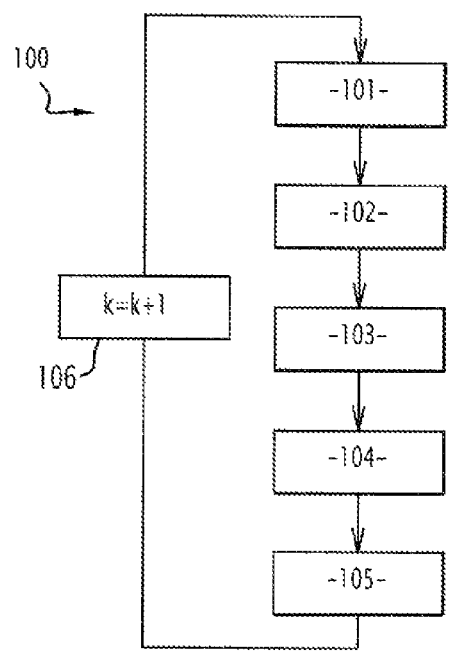
FIG. 4 represents a set of steps implemented in an embodiment of the invention.
Figure 5:
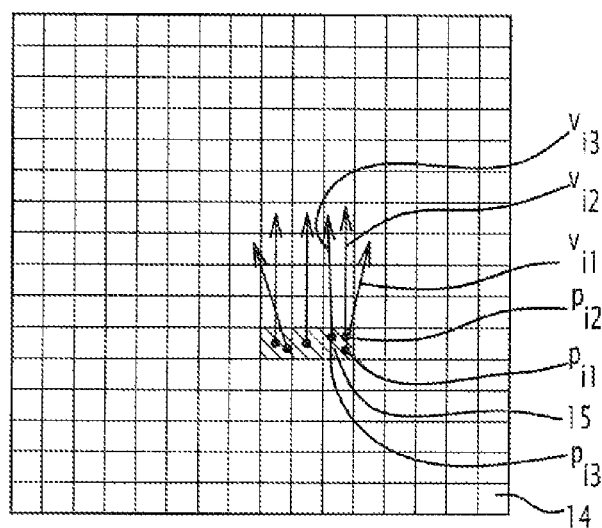
FIG. 5 represents an occupancy grid and the representation of the motion probabilities associated with a cell of the grid in a mode of implementation of the invention.

A set 100 of steps 101-106 implemented in a $k^{th}$ iteration at the instant $t_k=t_0+k.dt$, by the analysis device 20 is described hereinafter with reference to FIG. 4 in an embodiment of the invention (k≥1).

It is considered that on completion of the previous iteration, i.e. $(k-1)^{th}$ iteration, for each cell C of the grid, the probabilities associated with the static domain have been obtained:
- P(O=occ, V=0|ZC), called $P^{k-1}$(O=occ, V=0|ZC),
- P(O=empty, V=0|ZC), called $P^{k-1}$(O=empty, V=0|ZC), and that a set of particles has been assigned to the cell C, such that each particle in this set has a respective velocity $v_i^{k-1}$ and a respective position $x_i^{k-1}$ and that the probabilities associated with the dynamic domain P(O=occ, V=$v_i^{k-1}$|ZC), called $P^{k-1}$(P=occ, V=$v_i^{k-1}$|ZC) have been contained.

In the embodiment considered, the position $x_i^{k-1}$ makes it possible to exactly position the particles within the cell. The introduction of accurate positions of the particles within a cell makes it possible to solve problems of spatio-temporal aliasing.

In a step 101 of determining the propagation of the particles, for each particle, the motion model is applied, in accordance with the distribution P(V|V$^{-1}$):

$$v_i^{k'} = v_i^{k-1} + \sigma$$

$$x_i^{k'} = x_i^{k-1} + dt.v_i^{k'}$$

where σ is a Gaussian noise centered at 0 with covariance Σ.

In a step 102, the displacement of the grid corresponding to a displacement of the vehicle 10 if appropriate is taken into account, as a function of the rotation $R^k$ and of the translation $T^k$ that are performed between the iteration (k−1) and the current iteration k and that are determined by the sensor block 11:

$$v_i^k = R^k.v_i^{k'}$$

$$x_i^k = R^k.x_i^{k'} + T^k$$

In a step 103, the observations $z^k$ of the scene to be considered for the instant $t_k$ are collected (sub-step 103_0) and the probabilities P(Z|O, V, C) arising from these observations $z^k$ and modeling the sensor, as described above, are deduced from these observations.

Next, the probabilities of occupancy and of motion taking into account these collected observations are updated (sub-steps 103_1 to 103_3 detailed hereinafter).

The static part of each cell C is updated, in sub-step 103_1, by using the static share of the cell considered C determined on completion of the $(k-1)^{th}$ iteration, i.e. $P^{k-1}$ (occ, 0|Z, C) and $P^{k-1}$ (empty, 0|Z,C).

Indeed, $P(O^{-1}=occ, V=0|Z, A=C) = P^{k-1}(occ, 0, |Z, C)$, and $P(O^{-1}=empty, V=^{-1}=0|Z, A=C) = P^{k-1}(empty, 0, |Z, C)$.

It follows that the coefficients α(occ,0) and α(empty,0) in accordance with the definition given at equation (4) are obtained for the cell C considered through the following calculation:

$\alpha(occ,0) = P^{k-1}(occ,0|Z,C).(1-\varepsilon) + P^{k-1}(empty,0|Z,C).\varepsilon$ $\alpha(empty,0) = P^{k-1}(occ,0|Z,C).\varepsilon + P^{k-1}(empty,0|Z,C).(1-\varepsilon)$, where $\varepsilon = P(O=occ|O^{-1}=empty) = P(O=empty|O^{-1}=occ)$.

The dynamic part of the cells is in turn updated, by considering the particles. Thus, for each cell C of the grid, in a step 103_2:

it is determined which are the particles, from among the sets of particles associated with the cells, which lie in the cell C after the implementation of steps 101 and 102. Let us consider that $n_C^k$ particles lie in the cell C considered. Each of these particles has a respective velocity $v_i^k$ and a current position $x_i^k$ within the cell C and was in a cell, called $a_i$, at the iteration k−1, such as were determined on completion of step 102; and the weighting coefficient $w_i^{k-1}$ associated with this particle is defined: $w_i^{k-1} = P(O^{-1}=occ, V^{-1}=v_i^{k-1}|A=a_i, z^1, \ldots, z^{k-1})$ which is equal to $P^{k-1}(O=occ, V=v_i^{k-1}|a_i)$, determined at the iteration k−1 (sub-step 103_3) in relation to the cell $a_i$:

the coefficient $\alpha(occ, v_i^k)$ in accordance with the definition given at equation (4) is then determined for the cell C considered as equal to:

$\alpha(occ, v_i^k) = w_i^{k-1}.(1-\varepsilon)$; an empty cell is assumed to have zero velocity: $\alpha(empty, v_i^k) = 0$.

In a sub-step 103_3 of updating the probabilities, for each cell C, to terminate the solving of equation (3), β(occ,0), β(empty,0) and β(occ, $v_i^k$) are calculated in the following manner, with the aid of the updated observation probabilities P(Z|O, V, C) arising from sub-step 103_0 and of the coefficients α(occ,0), α(empty,0) and α(occ, $v_i^k$) calculated during sub-steps 103_1 and 103_2:

$\beta(occ,0) = P(Z|occ,0,C).\alpha(occ,0)$ $\beta(empty,0) = P(Z|empty,0,C).\alpha(empty,0)$ $\beta(occ,v_i^k) = P(Z|occ,v_i^k,C).\alpha(occ,v_i^k)$.

The denominator of equation (2), called the scale factor "d", is calculated:

$d = \beta(occ,0) + \beta(empty,0) + \Sigma_i \beta(occ,v_i^k)$, where $\Sigma_i \beta(occ, v_i^k)$ is the sum of the coefficients β(occ, $v_i^k$) calculated for the particles lying in the cell C.

Finally, the following probabilities are obtained for the cell C, which represent the Bayesian filtering occupancy and the associated probabilities of motion:

$$P^k(occ, 0 | Z, C) = \frac{\beta(occ, 0)}{d}$$

for the zero velocity, $$P^k(occ, v_i^k | Z, C) = \frac{\beta(occ, v_i^k)}{d}$$

for each velocity $v_i^k$, the velocities $v_i^k$ being the velocities of the particles determined in the cell C, $$P^k(empty, 0 | Z, C) = \frac{\beta(empty, 0)}{d}$$

for the zero velocity.

A step 104 (optional) of reorganizing the particles is implemented thereafter so as to adapt the number of particles per cell and for example duplicate the particles with high probability, doing this so as to allow a better effectiveness of the set of steps 100, by implementing the process Proc_reorg indicated hereinbelow. It will be noted that the accuracy of the representation of the velocity distribution in a cell grows with the number of particles in the cell.

In the embodiment considered, the total number of particles, called nbPart, is maintained constant during the iterations (the calculational load is thus the same for each iteration, the memory to be allocated is constant and known). This total number can evolve in other embodiments (for example, the total number could be increased for a very dynamic scene and be decreased for a more static scene).

For each cell C, the weighted set of the $n_C^k$ particles is considered, defined by the $n_C^k$ triplets $\{x_i^k, v_i^k, w_i^k\}$, each associated with a particle, where $w_i^k = P^k(O=occ, V=v_i^k|Z, C)$.

According to the process Proc_reorg, the set of following successive steps i, ii and iii is repeated a number equal to nbPart, after having initialized to an empty set, per cell of the grid, a new set of particles assigned to the cell:

i/ draw a cell identifier according to an occurrence law proportional to the weight of the cell (the weight of a cell C is equal to the sum of the $n_C^k$ weights $w_i^k$ of the particles in the cell and therefore represents $P^k(O=occ, V\neq 0|Z, C)$);

ii/ randomly select a particle from among the $n_C^k$ particles of this cell, according to an occurrence law proportional to the weight $w_i^k$ of the particle;

iii/ add the particle selected in ii/ to the new set of particles assigned to the cell whose identifier was drawn in i/.

Once these steps have been repeated, the weight of the particles is normalized per cell, i.e. the weight of each particle in the new set of particles assigned to the cell is divided by the sum of the weights of the particles in this new set; it is these normalized weights which are considered to be the weights $w_i^k$ for the following iteration.

In a step 106, the value of k is increased by 1.

When a new object appears on the grid, it is necessary to initialize one or more corresponding particles with a velocity distribution.

Accordingly, in an embodiment, a constant probability of appearance with a uniform distribution between the occupied/empty states and between static/dynamic is added. For example, in step 103_1, α(occ,0), respectively α(empty,0), are calculated by adding $p_a/4$, respectively $p_a/2$, i.e.

$\alpha(occ,0) = P^{k-1}(occ,0|Z,C).(1-\varepsilon) + P^{k-1}(empty,0|Z,C).\varepsilon + p_a/4$ $\alpha(empty,0) = P^{k-1}(occ,0|Z,C).\varepsilon + P^{k-1}(empty,0|Z,C).(1-\varepsilon) + p_a/2$;

and in step 103_2, an additional dynamic term α(occ, V="unknown") = $p_a/4$ is considered for the cell. Thus in step 104 of reorganizing the particles, when the velocity "unknown" is selected (step ii/), the velocity is determined on the basis of a uniform distribution, by uniformly selecting a velocity over $[-V_{max}, +V_{max}] \times [-V_{max}, +V_{max}]$ and by associating it with the cell.

In one embodiment which may or may not be combined with the previous embodiment, to prevent particles from following a static object, each particle contributes to the static share represented by $\alpha(occ,0)$ calculated in step 103_1, by a coefficient whose value decreases with the norm of the velocity:

$$\alpha(occ, 0) = P^{k-1}(occ, 0 | Z, C).(1 - \varepsilon) +$$

$$P^{k-1}(empty, 0 | Z, C).\varepsilon + \Sigma_{i=1 \text{ to } n_C^k} e^{\frac{-\|v_i^k\|^2}{2\sigma_s^2}} . w_i^{k-1}.(1 - \varepsilon);$$

and in step 103_2:

$$\alpha(occ, v_i^k) = \left(1 - e^{\frac{-\|v_i^k\|^2}{2\sigma_s^2}}\right).w_i^{k-1}.(1 - \varepsilon),$$

where $\sigma_s$ is a constant coefficient representing the static velocity contribution (for $\|v_i^k\| \leq 3 < \sigma_s$, the static contribution is insignificant).

In an initialization step prior to the first iteration (k=1) of the whole of step 100, there is undertaken, in one embodiment, just as for the antecedents of type "unknown", uniform drawing of the velocity over $[-V_{max}, V_{max}] \times [-V_{max}, V_{max}]$. The position is taken by drawing uniformly over the grid (drawing of a floating position on [-gridWidth/2, gridWidth/2]×[-gridHeight/2, gridHeight/2], where gridWidth is the width of the grid and gridHeight is the height of the grid), the occupancy is fixed at 0.5 (unknown). The $w_i^0$ are equal to $1/n_C^0$, this number $n_C^0$ of particles in the cell C being a result of the previous random draw. The initial static probability is a parameter that does not have a great impact, since the reevaluation takes place very rapidly.

Thus according to the invention, the conventional BOF representation comprising an occupancy grid and associating a velocity histogram with each cell of the grid is replaced with an occupancy grid with, for each cell, a probability of occupancy, a static coefficient corresponding to a zero velocity probability, a set of particles in the cell, each having a respective velocity v, and a set of probabilities $P(V=v_i)$.

The invention makes it possible to construct at each iteration, via the grid, a discrete probabilistic map of the scene, while distinguishing the static and dynamic components. The motion of the dynamic components is estimated with the aid of the particles.

The quality of the occupancy and velocity estimations is improved, by better accuracy of the calculated velocities and a decrease in the effects of spatio-temporal aliasing.

By way of illustration, the occupancy grid 14 obtained in one embodiment of the invention is represented. The cell 15 of the occupancy grid 14 comprises for example 3 particles $p_{ij}$, at respective positions in the cell, having respective velocities $v_{ij}$, j=1 to 3.

The observations and estimations of displacement of the vehicle are performed by the sensors and provided to the analysis device 20, and then processed in real time by the analysis device 20. For example the iteration time-step dt is equal to 0.06 seconds, the grid refresh observations and the displacement estimations being provided to the analysis device 20 according to time-steps of duration less than or equal to dt.

The occupancy and velocity values associated with the particles determined for each cell at each iteration can, in embodiments of the invention, be utilized in various ways in a step 105:
  current action/decision as a function of the values of occupancies and of velocity fields determined for each cell (by
  prediction of future state(s) of the environment (for example evaluation of risks of collisions between the vehicle 10 and objects corresponding to cells for which the probability of occupancy is greater than a given occupancy threshold and the observed distance is below a given distance threshold), and then for example current action/decision as a function of one or more determined future states (automatic braking of the vehicle 10 for example); it will be noted that the velocity distributions inferred by the invention are directly usable to predict the evolution of the scene, and therefore to deduce the intersection between the vehicle and obstacles, including dynamic objects.

The steps of the method 100 are readily parallelizable.

The determination of the occupancy grid and of the velocity fields is achievable for an analyzed environment comprising any sort of objects which are or are not previously known with the aid of sensors, even heterogeneous sensors, by virtue of the use of probabilistic sensor models.

The present invention makes it possible to markedly decrease the resources in terms of calculation and memory that are required for the determination of the occupancy of the cells and of the motion probability distributions. It makes it possible to attain gain of a factor 100.

It makes it possible to compensate the sensors' own motion (calculating the operations of rotation/translation of the grids and particles over the velocity fields when they were considered in the form of BOF histograms was in practice impossible because of excessive aliasing and of 4D interpolation that was overly expensive in terms of calculations).

The quality of the results is improved through the decrease in the spatio-temporal aliasing effects and through more accurate determination of the velocities.

The invention claimed is:

1. A method for analyzing a dynamic scene observed with the aid of one or more sensors, the method comprising:
  defining a grid that is partitioned into cells and corresponding to the observed scene;
  collecting at least one new observation of the one or more sensors at a $k^{th}$ iteration;
  determining, as a function of the new collected observation, a first probability of occupancy of each cell of the grid modeling the operation of the one or more sensors;
  determining, for each cell, at the $k^{th}$ iteration, a second probability of occupancy of the cell and a set of probabilities of motion of the content of the cell as a function of the first probability of occupancy of the cell determined at the $k^{th}$ iteration,
  wherein the second probability of occupancy of the cell and of the set of probabilities of motion of the content of the cell as a function of the first probability of occupancy of the cell determined at the $k^{th}$ iteration is determined based on:
  C, an identifier of the cell considered;

A, an identifier of the cell which contained, at the $(k-1)^{th}$ iteration, what is contained in the cell considered at the $k^{th}$ iteration;
O, an occupancy state of the cell considered, from among the empty and occupied states;
$O^{-1}$, an occupancy state of the cell at the $(k-1)^{th}$ iteration;
V, a velocity of the cell considered;
V-1, a velocity of the cell at the $(k-1)^{th}$ iteration; and
Z, observations of the sensors from the first iteration up to the $k^{th}$ iteration;
wherein respective velocity and the respective position of a set of dummy particles in the grid are determined at the $k^{th}$ iteration as a function of the velocities, positions of the particles determined at the $(k-1)^{th}$ iteration and of a probability P(V|V-1);
the method comprises a step of determining the particles located in each cell as a function of the positions determined and in that the solving of an equation, for a cell, is split into the solving of a static part corresponding to P(O=empty, V=0|ZC) and P(O=occupied, V=0|ZC) and into the solving of a dynamic part corresponding to the P(O=occ, V=$v_i^k$,|ZC), i=1 to $n^k$, where $n^k$ is the number of particles determined in a cell C for the $k^{th}$ iteration; and
wherein the static part of the cell C at the $k^{th}$ iteration being determined as a function of the static part of the cell C determined at the $(k-1)^{th}$ iteration and of P(O|$O^{-1}$);
the probability of P(O=occupied, V=$v_i^k$,|ZC) of the dynamic part of the cell C being determined at the $k^{th}$ iteration as a function of the probability P(O=occupied, V=$v_i^{k-1}$,|ZA) calculated at the $(k-1)^{th}$ iteration for the dynamic part of a cell A and of P(O|$O^{-1}$),
where the particle $p_i$ determined in the cell C at the $k^{th}$ iteration with a velocity $v_i^{k-1}$ was situated in the cell A at the $(k-1)^{th}$ iteration with a velocity $v_i^{k-1}$, and on completion of the $k^{th}$ iteration, one or more pairs $(p_i, (v_i^k, x_i^k))$, where $x_i^k$ the position of the particle $p_i$ at the $k^{th}$ iteration, are duplicated within a cell or deleted so that the number of pairs per cell is dependent on the dynamic part determined for the cell.

2. The method of claim 1, further comprising selecting the pair to be duplicated or deleted, wherein the selection of said pair being carried out as a function of the probability P(O=occupied, V=$v_i^k$|ZC) is determined at the $k^{th}$ iteration, and where $v_i^k$ is a velocity component of the pair.

3. The method of claim 1, wherein the total number of particles in the grid is constant during the iterations.

4. The method of claim 1, wherein P(O=empty, V=0|ZC) is determined at the $k^{th}$ iteration, is denoted as $P^k$(O=empty, V=0|ZC), and is determined as a function of the product of a first term dependent on the first probability of occupancy and of a second term, said second term being dependent on:

$$P^{k-1}(O=\text{occ},V=0|ZC).(1-\varepsilon)+P^{k-1}(O=\text{empty}, V=0|ZC).\varepsilon,$$

where $\varepsilon$=P(O=occ|$O^{-1}$=empty)=P(O=empty|$O^{-1}$=occ); and/or
coeff $(v_i^k)$.$P^{k-1}$(O=occupied, V=$v_i^{k-1}$,|ZA).(1-$\varepsilon$), where coeff $(v_i^k)$ is a decreasing function of $\|v_i^k\|$, and/or
a probability of appearance $p_a$ of a new object in the observed scene.

5. A device effective to analyze a dynamic scene observed with the aid of one or more sensors, the device is configured to:
define a grid partitioned into cells and corresponding to the observed scene;
collect at least one new observation of the one or more sensors at a $k^{th}$ iteration and determining, as a function of the new collected observation, a first probability of occupancy of each cell of the grid and that models the operation of the one or more sensors;
determine, for each cell, at the $k^{th}$ iteration, a second probability of occupancy of the cell and a set of probabilities of motion of the content of the cell as a function of the first probability of occupancy of the cell determined at the $k^{th}$ iteration,
wherein the device is adapted to determine said second probability of occupancy of the cell and the set of probabilities of motion of the content of the cell as a function of the first probability of occupancy of the cell determined at the $k^{th}$ iteration based on:
C, an identifier of the cell considered;
A, an identifier of the cell which contained, at the $(k-1)^{th}$ iteration, what is contained in the cell considered at the $k^{th}$ iteration;
O, an occupancy state of the cell considered, from among the empty and occupied states;
$O^{-1}$, an occupancy state of the cell at the $(k-1)^{th}$ iteration;
V, a velocity of the cell considered;
V-1, a velocity of the cell at the $(k-1)^{th}$ iteration;
Z, an observations of the sensors from the first iteration up to the $k^{th}$ iteration;
wherein the device is further configured to:
determine, at the $k^{th}$ iteration, the respective velocity and the respective position of a set of dummy particles in the grid as a function of the velocities, of the positions of the particles determined at the $(k-1)^{th}$ iteration and of the probability P(V|V-1);
determine particles located in each cell as a function of the positions determined and to split the solving of an equation, for a cell, into the solving of a static part corresponding to P(O=empty, V=0|ZC) and P(O=occupied, V=0|ZC) and into the solving of a dynamic part corresponding to the P(O=occ, V=$v_i^k$, |ZC), i=1 to $n^k$, where $n^k$ is the number of particles determined in the cell C for the $k^{th}$ iteration;
determine the static part of the cell C at the $k^{th}$ iteration as a function of the static part of a cell C determined at the $(k-1)^{th}$ iteration and of P(O|$O^{-1}$); and
determine the probability of P(O=occupied, V=$v_i^k$,|ZC) of the dynamic part of the cell C at the $k^{th}$ iteration as a function of the probability P(O=occupied, V=$v_i^{k-1}$,|ZA) calculated at the $(k-1)^{th}$ iteration for the dynamic part of a cell A and of P(O|$O^{-1}$),
where the particle $p_i$ determined in the cell C at the $k^{th}$ iteration with a velocity $v_i^k$ was situated in the cell A at the $(k-1)^{th}$ iteration with a velocity $v_i^{k-1}$;
wherein on completion of the $k^{th}$ iteration, duplicate or delete one or more pairs $(p_i, (v_i^k, x_i^k))$, where $x_i^k$ is the position of the particle $p_i$ at the $k^{th}$ iteration, within a cell so that the number of pairs per cell is dependent on the dynamic part determined for the cell.

6. The device of claim 5, adapted to select said pair to be duplicated/deleted, as a function of the probability P(O=occupied, V=$v_i^k$|ZC) is determined at the $k^{th}$ iteration, and where $v_i^k$ is a velocity component of the pair.

7. The device of claim 5, wherein the total number of particles in the grid is constant during the iterations.

8. The device of claim 5, adapted to determine P(O=empty, V=0|ZC) at the $k^{th}$ iteration, denoted $P^k$(O=empty, V=0|ZC), as a function of the product of a first term dependent on the first probability of occupancy and of a second term, said second term being dependent on:

$P^{k-1}(O=occ, V=0|ZC).(1-\varepsilon)+P^{k-1}(O=empty, V=0|ZC).\varepsilon,$ where $\varepsilon=P(O=occ|O^{-1}=empty)=P(O=empty|O^{-1}=occ)$; and/or coeff $(v_i^k).P^{k-1}$ (O=occupied, $V=v_i^{k-1}$,|ZA).$(1-\varepsilon)$, where coeff $(v_i^k)$ is a decreasing function of $|v_i^k|$, and/or a probability of appearance $p_a$ of a new object in the observed scene.

9. A non-transitory computer accessible medium that includes computer-executable instructions stored thereon that are executable by a computing device to perform the method of claim 1.

\* \* \* \* \*